United States Patent [19]
Eberhardt et al.

[11] Patent Number: 6,107,921
[45] Date of Patent: Aug. 22, 2000

[54] CONVEYOR BED WITH OPENINGS FOR CAPACITIVE COUPLED READERS

[75] Inventors: Noel H. Eberhardt, Cupertino; Victor Allen Vega, Hercules; James Gerard Quaderer, Sunnyvale, all of Calif.

[73] Assignee: Motorola, Inc., Schaumburg, Ill.

[21] Appl. No.: 09/225,760

[22] Filed: Jan. 5, 1999

Related U.S. Application Data

[63] Continuation-in-part of application No. 09/061,146, Apr. 16, 1998.

[51] Int. Cl.⁷ .................................................. G08B 13/14
[52] U.S. Cl. .................................. 340/572.7; 340/572.8; 340/572.1; 343/720; 343/764; 343/765; 343/766; 343/866
[58] Field of Search ........................... 340/572.1, 572.7, 340/572.8, 551, 826.54; 235/440; 343/720, 764, 765, 766, 866

[56] References Cited

U.S. PATENT DOCUMENTS

| | | | |
|---|---|---|---|
| 3,713,102 | 1/1973 | Martin | 340/572.1 |
| 3,832,530 | 8/1974 | Reitboeck et al. | 340/572.1 |
| 5,221,831 | 6/1993 | Geiszler | 235/440 |
| 5,376,923 | 12/1994 | Kindschy | 340/572.3 |
| 5,410,296 | 4/1995 | Montbriand et al. | 340/551 |
| 5,523,749 | 6/1996 | Cole et al. | 340/825.54 |
| 5,689,239 | 11/1997 | Turner et al. | 340/572.1 |
| 5,793,305 | 8/1998 | Turner et al. | 340/825.54 |
| 5,929,760 | 7/1999 | Monahan | 340/572.7 |

*Primary Examiner*—Benjamin C. Lee
*Attorney, Agent, or Firm*—Terri S. Hughes

[57] ABSTRACT

Identification tags are secured to parcels moving upon a conveyor belt. The identification tags each contain a transponder circuit in electrical communication with a transponder antenna. The transponder circuit contains a unique digital code containing data relating to the parcel. When the identification tag is located beneath a parcel, at least one reader circuit is positioned beneath the conveyor belt in alignment with a selected aperture extending through the. One or more apertures in alignment with the reader antenna provide electrical communication with the reader antenna. The reader circuit generates a signal in the presence of an identification tag, which is transmitted to the transponder antenna located on the identification tag. The signal energizes the transponder circuit in the identification tag, which sends a unique digital code via the transponder antenna back to the reader antenna. The digital code is transmitted from the reader antenna to the reader circuit, where the digital code is analyzed to identify the contents of the parcel.

31 Claims, 6 Drawing Sheets

CONVEYOR BED WITH OPENINGS FOR CAPACITIVE COUPLED READERS

CROSS-REFERENCE TO RELATED APPLICATIONS

This is a continuation-in-part of a pending commonly-assigned prior application by Theodore D. Geiszler et al. entitled "Remotely powered electronic tag with plural electrostatic antennas and associated exciter/reader and related method; radio frequency identification tag system using tags arranged for coupling to ground; radio frequency identification tag arranged for magnetically storing tag state information; and radio frequency identification tag with a programmable circuit state," application Ser. No. 09/061,146, filed Apr. 16, 1998, attorney docket number IND00701P01, the disclosure of which prior application is hereby incorporated by reference, verbatim and with the same effect as though it were fully and completely set forth herein.

TECHNICAL FIELD

This invention relates to the identification of parcels placed upon a conveyor, wherein the parcels have identification tags located on the bottom of the parcel. The conveyor bed has openings which enable scanning of identification tags by capacitive coupled readers located beneath a parcel on a conveyor.

BACKGROUND OF THE INVENTION

Automatic conveyor systems often transport a plurality of goods in parcels which must be individually identified to be properly sorted. Parcels such as airline baggage, shipping containers, production inventory, machine parts, and component parts are often identified with flexible tags or labels. Electromagnetic sensing is sometimes used to identify the flexible tags or labels on individual parcels placed upon a conveyor. When the parcels are oriented so that the identification tags are located beneath the parcel on a conveyor, they cannot be read by conventional line of sight reading equipment located above the conveyor. Thus, what is needed is one or more apertures positioned upon the conveyor bed, so that electromagnetic or electrostatic sensing equipment located beneath the conveyor can read the identification tag located beneath the parcel through the conveyor belt.

U.S. Pat. No. 5,450,492 issuing to Hook et al. on Sep. 12, 1995 is representative of an electronic identification system having a transmitter for generating an electromagnetic excitation signal, and one or more transponder s with variable time and frequency.

U.S. Pat. No. 4,724,953 issuing to Winchester on Feb. 16, 1988 discloses a food conveyor apparatus having a plurality of rows of oblong holes positioned along the length of the conveyor, with each row offset from adjacent rows of holes. The platform supports an endless mesh conveyor belt. The plurality of holes and the endless mesh conveyor belt allow food debris to fall through the conveyor belt and platform to simplify cleaning in a food processing environment.

U.S. Pat. No. 5,040,549 issuing to Ray on Aug. 20, 1991 discloses a belt conveyor for feeding tobacco into a cutting machine. A plate supporting the conveyor belt has a plurality of apertures through which debris may fall or be swept, and a means below the plate to collect the particulate material.

To be effective, the identification tags on individual parcels must be oriented to position the identification tags in relation to the reader antenna positioned in proximity to the conveyor belt. Manual orientation of the parcels to orient the identification tags in relation to reader antenna is labor intensive and time consuming. Where the identification tag is positioned beneath the parcel, it cannot easily be read by reader antenna positioned above the conveyor. Thus, what is needed is a way to position the reader antenna beneath the conveyor belt to read identification tags located beneath the parcel.

SUMMARY OF THE INVENTION

Multiple parcels, each having an identification tag secured thereon, are moved along a conveyor. The identification tags each contain a transponder circuit in electrical communication with first and second transponder antennas. The transponder circuit contains information relating to identification of the parcel. A reader circuit located in proximity to the conveyor is in electrical communication with at least one reader antenna. The reader circuit generates a signal of alternating polarity, which is transmitted to the transponder antennas located on the identification tag. The signal energizes the transponder circuit in the identification tag, which sends a unique digital code via the transponder antenna back to the reader antenna. The digital code is transmitted from the reader antenna to the reader circuit, where the digital code is analyzed to identify the parcel. The identification tags located beneath the parcel are read by reader antenna located beneath the conveyor, and positioned in alignment with one or more apertures provided in the conveyor support plate.

BRIEF DESCRIPTION OF THE DRAWINGS

A preferred embodiment of the present invention will now be described with reference to the accompanying drawings, in which.

DETAILED DESCRIPTION OF THE PREFERRED EMBODIMENTS

The conveyor apparatus 10 shown in FIG. 1 through FIG. 8 comprises a conductive conveyor support plate 12 secured to a conveyor frame 14. An endless non-conductive conveyor belt 16 is powered by a suitable drive means 18, such as a motor, belt or shaft, to advance the endless conveyor belt 16 along the conveyor frame 14.

Alternately, a plurality of conductive rollers 40 extend between opposing sides of the conveyor frame 14. The rollers 40 may be powered by a suitable drive means 18, or may be inclined to rotate in the presence of a parcel 20 by the force of gravity in a manner well known in the art.

Figure 1:
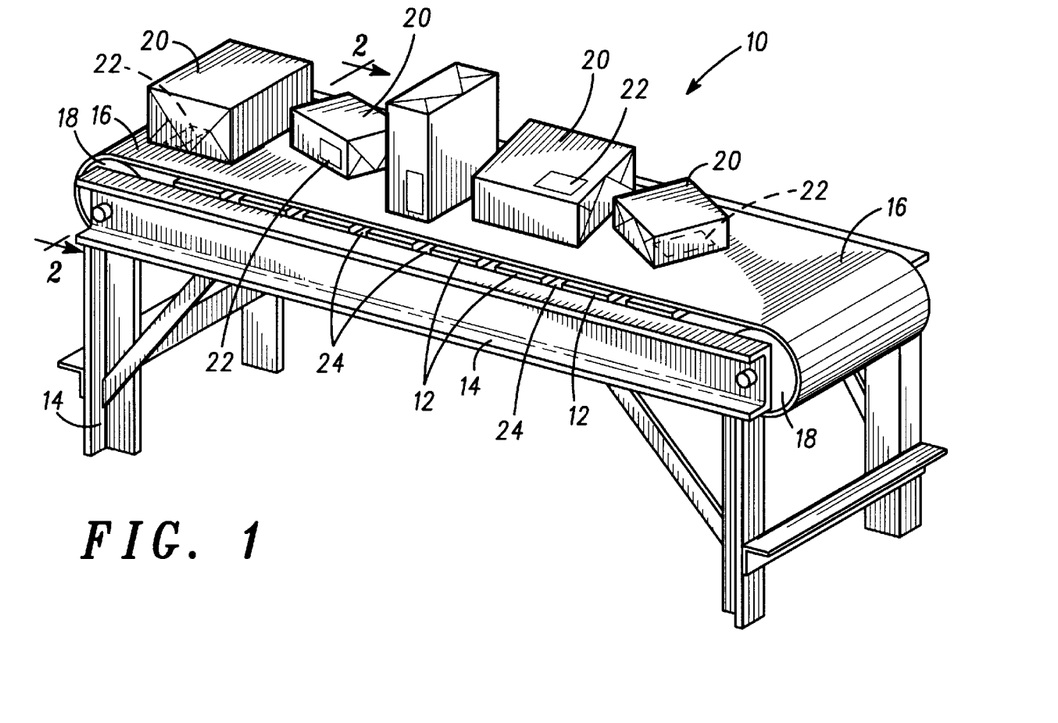
FIG. 1 is a perspective view of a plurality of parcels located upon a conveyor, with some identification tags located beneath the parcel.
Figure 2:
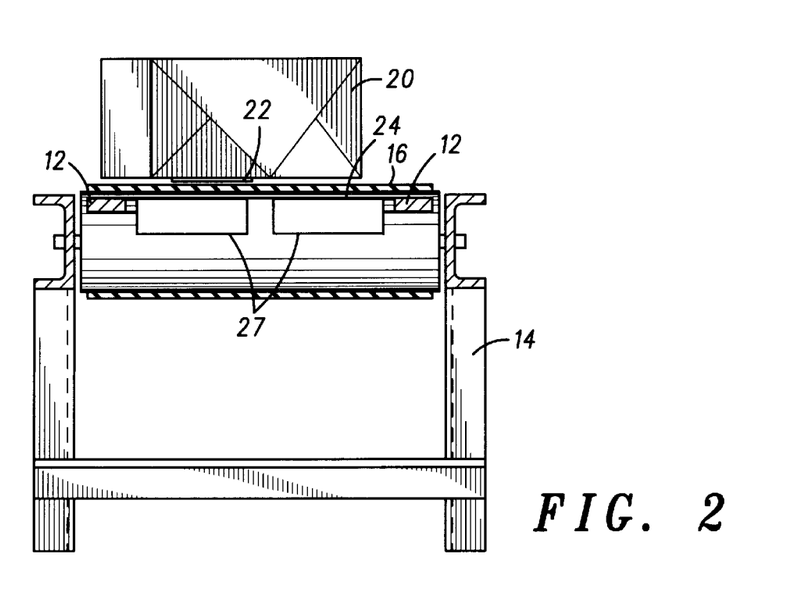
FIG. 2 is an cross sectional view of the conveyor taken along lines 2—2 in FIG. 1, showing reader antenna located beneath the conveyor in alignment with suitable apertures located in the conveyor support plate.

The conveyor belt 16 advances along the conveyor support plate 12 to move randomly oriented parcels 20, each having an identification tag 22 secured thereto, as shown in FIG. 1 and FIG. 2.

The identification tags or labels 22 are placed upon a side of each parcel 20 prior to placing the parcel 20 upon the conveyor belt 16. The parcels 20 may be of random size and shape. As the parcels 20 are randomly positioned upon the conveyor belt 16, the identification tags 22 may be located to either the front side, rear side, left side, top side or the bottom side of the parcel 20. When the identification tag(s) 22 are positioned beneath the parcel 20, line of sight reading equipment, located above the conveyor belt 16 cannot read the identification tag(s) 22. In order to ensure that each parcel 20 is properly identified as it passes along the conveyor belt 16, first and second reader antenna 26, 27 are positioned beneath the conveyor support plate 12 in alignment with suitable apertures 34 located in the conveyor support plate 12.

Moving the parcel 20 across the apertures 34 in the conveyor support plate 12 enables the second transponder antenna 31 located in the identification tag 22 to be coupled with the second reader antenna 27 and read by the reader circuit 28.

Figure 3A:
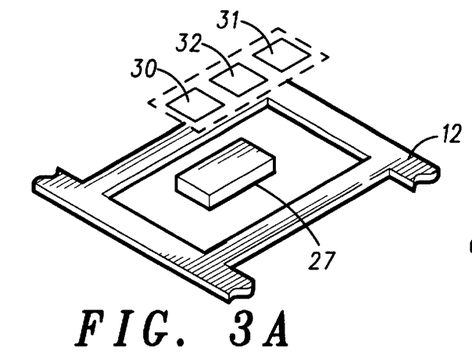
FIG. 3A is a partial view of the conveyor support plate having a transverse slot extending through the conveyor support plate, with a reader antenna positioned in the transverse slot, and the transponder antenna positioned in parallel alignment with the reader antenna.

FIG. 3A shows the orientation of the first and second transponder antenna 30, 31 located in the identification tag 22 in parallel alignment with aperture 34. This configuration will not work, as the first and second transponder antenna 30, 31 would couple simultaneously to either the first and second reader antenna 26, 27 or to the conveyor support plate 12.

Figure 3B:
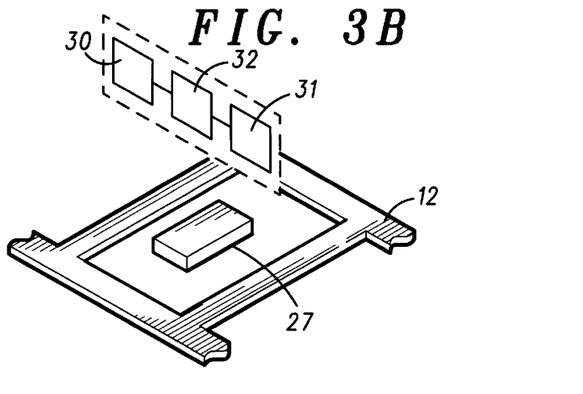
FIG. 3B is a partial view of the conveyor support plate shown in FIG. 3A, wherein the transponder antenna is positioned in non-parallel alignment with the reader antenna.

FIG. 3B shows the first and second transponder antennae 30, 31 located in the identification tag 22 positioned in non-parallel alignment to aperture 34, in order to couple the first reader antenna to the conveyor support plate 12. The second reader antenna 27 couples to the second transponder antenna 31, as the parcel 20 moves upon the conveyor belt 16. The transponder antenna 30, 31 may be either horizontally or vertically oriented in relation to the conveyor support plate 12. This configuration works.

Figure 3C:
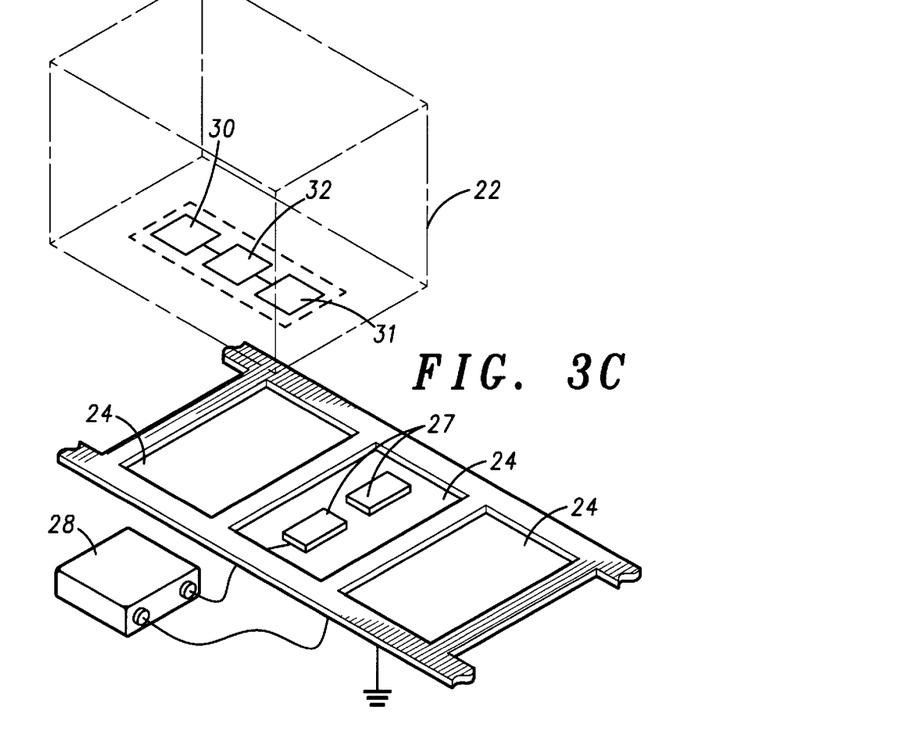
FIG. 3C is a partial view of the conveyor support plate with a parcel positioned above the conveyor support plate.
Figure 3D:
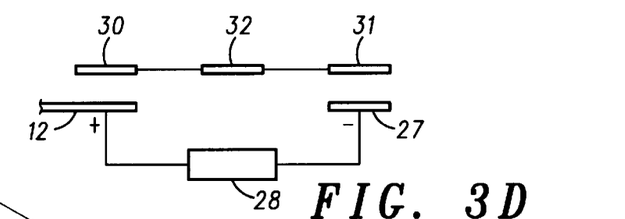
FIG. 3D is a schematic view of the reader circuit in relation to the transponder circuit shown in FIG. 3C.

FIG. 3C shows the principle of operation for FIG. 1 through FIG. 4 and FIG. 7. The output from the reader circuit 28 is a current of alternating polarity which is electrically connected to the first and second reader antenna 26, 27. The first reader antenna 26 is coupled to the conveyor support plate 12 and the second reader antenna 27 is positioned within one of the apertures 34 in the conveyor support plate 12. As the identification tag 22 located beneath a parcel 20 passes over the conveyor apertures 34, the first transponder antenna 30 couples with the conveyor support plate 12 and the second transponder antenna 31 couples with the second reader antenna 27, thereby creating a current flow through the transponder circuit 32. The transponder circuit 32 then sends data through the second transponder antenna 31 to the second reader antenna 27, which is in electrical communication with the reader circuit 28. The reader circuit 28 processes the data to determine the identification of the parcel 20.

A common ground connection may be used between the first transponder antenna 30 and the conveyor support plate, as shown in FIG. 3C, eliminating the need for the first reader antenna 26. This is shown schematically in FIG. 6B.

Parallel orientation of the first reader antenna 26 and second reader antenna 27 in relation to the first transponder antenna 30 and second transponder antenna 31 significantly decreases bistatic coupling between the reader antenna(s) 26, 27 and the transponder antennas 30, 31 located in the identification tag 22. Therefore, the first reader antenna 26 and second reader antenna 27 are positioned in non-parallel alignment with the first transponder antenna 30 and second transponder antenna 31 located in each identification tag 22.

Figure 6A:
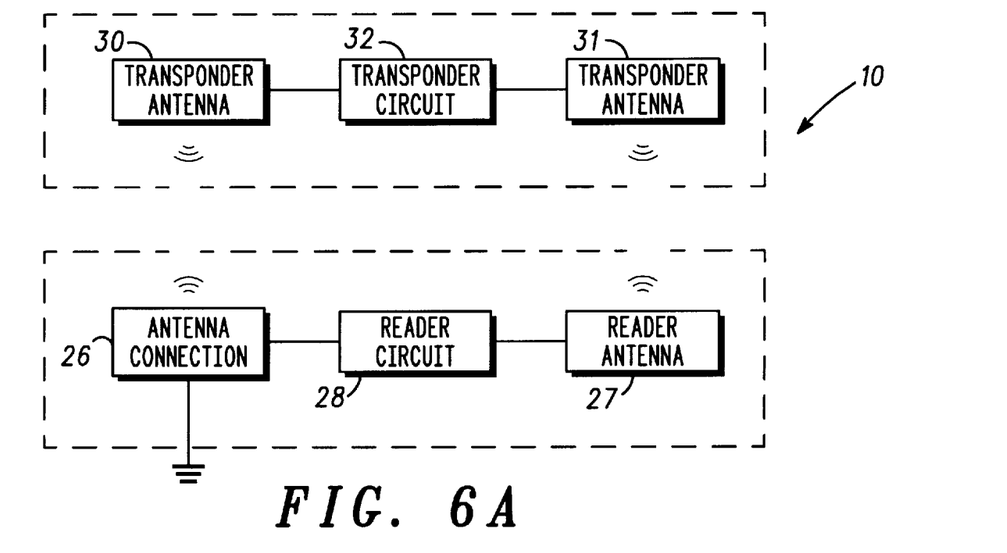
FIG. 6A is a schematic view of the reader circuit with first and second reader antenna and the transponder circuit with first and second transponder antenna, wherein the first reader antenna is connected to ground.
Figure 6B:
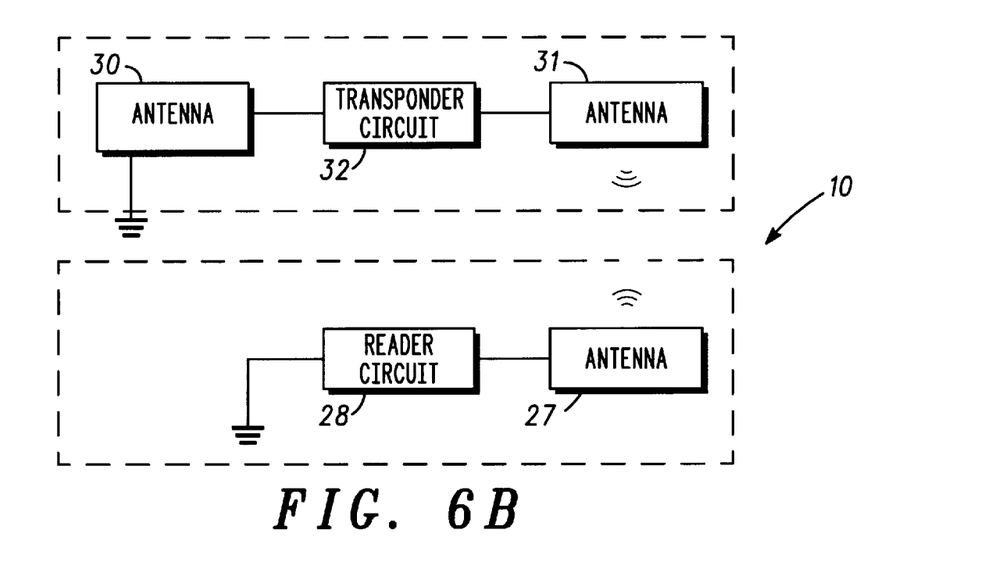
FIG. 6B is a schematic view of the reader circuit and transponder circuit, wherein the reader circuit and first transponder antenna are each connected to ground.

The identification tag(s) 22 each contain a transponder circuit 32 in electrical communication with the first transponder antenna 30 and the second transponder antenna 31, as shown in FIG. 6A and FIG. 6B. The transponder circuit 32 contains a unique digital code which contains information relating to the contents, destination, ownership, history or inventory data relating to a specific parcel 20.

FIG. 6A shows a reader circuit 28 in electrical communication with the first reader antenna 26 and second reader antenna 27 located beneath the conveyor support plate 12. The reader circuit 28 generates a signal of alternating polarity which is transmitted by the second reader antenna 27 through a suitable aperture 34 in the conveyor support plate 12. The first reader antenna 26 is preferably connected to ground as shown in FIG. 6A. Alternately, the reader circuit 28 may be connected to ground, and the first transponder antenna 30 is also connected to ground, as shown in FIG. 6B.

The signal is transmitted to the first and second transponder antennas 30, 31 located on the identification tag 22 positioned between the bottom of the parcel 20 and the conveyor belt 16. The signal of alternating polarity energizes the transponder circuit 32 in the identification tag 22, which sends a unique digital code via one of the transponder antennas 30, 31 back to one of the reader antennas 26, 27. The digital code is transmitted from the respective reader antenna 26, 27 to the reader circuit 28, where the digital code is analyzed to identify the ownership, contents, history, destination, and/or disposition of the parcel 20.

Figure 4A:
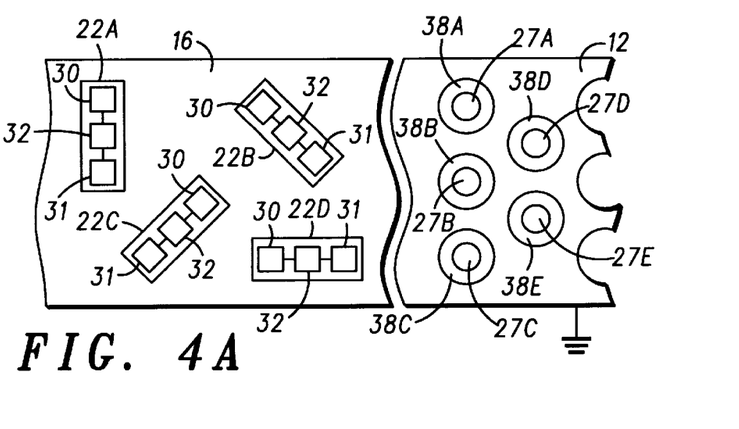
FIG. 4A is a partial top view of the conveyor support plate having a plurality of apertures extending through the conveyor support plate with a plurality of reader antenna positioned in the apertures, and several transponder circuits shown in various orientations upon the conveyor belt.

Any non-parallel alignment of the reader antennas 26, 27 in relation to the transponder antennas 30, 31 located in the identification tag 22 will produce satisfactory results. FIG. 4A shows several identification tags 22 positioned in random orientation upon a conveyor belt 16. A plurality of side by side apertures 38A through 38E each have a respective reader antenna 27A through 27E positioned therein. Identification tag 22A will be read by reader antenna 27A and 27B. Identification tag 22B will be read by reader antenna 27A and 27D. Identification tag 22C will be read by reader antenna 27B and 27C. Identification tag 22D will be read by reader antenna 27C and 27E.

Figures 4B, 7B:
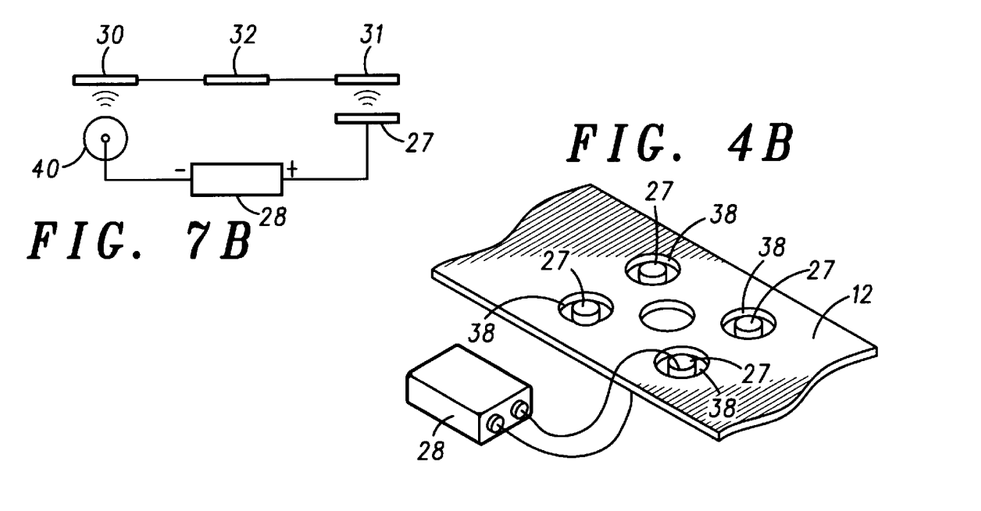
FIG. 4B is a schematic view of the conveyor support plate and reader circuit shown in FIG. 4A.
FIG. 7B is a schematic view of the reader circuit and transponder circuit shown in FIG. 7A.

The apertures 24 in the conveyor support plate 12, may be transverse apertures 36, as shown in FIG. 3A, FIG. 3B and FIG. 3C. Alternately, a plurality of offset apertures 38 may be provided, as shown in FIG. 4A and 4B. In either event, the apertures 24 or 38 in the conveyor support plate 12 provide for passage of the signal from one of the reader antennas 26, 27 positioned in proximity to the aperture 24 or 33 in the conveyor support plate 12 to a respective one of the transponder antennas 30, 31 located in the identification tag 22.

Figure 5A:
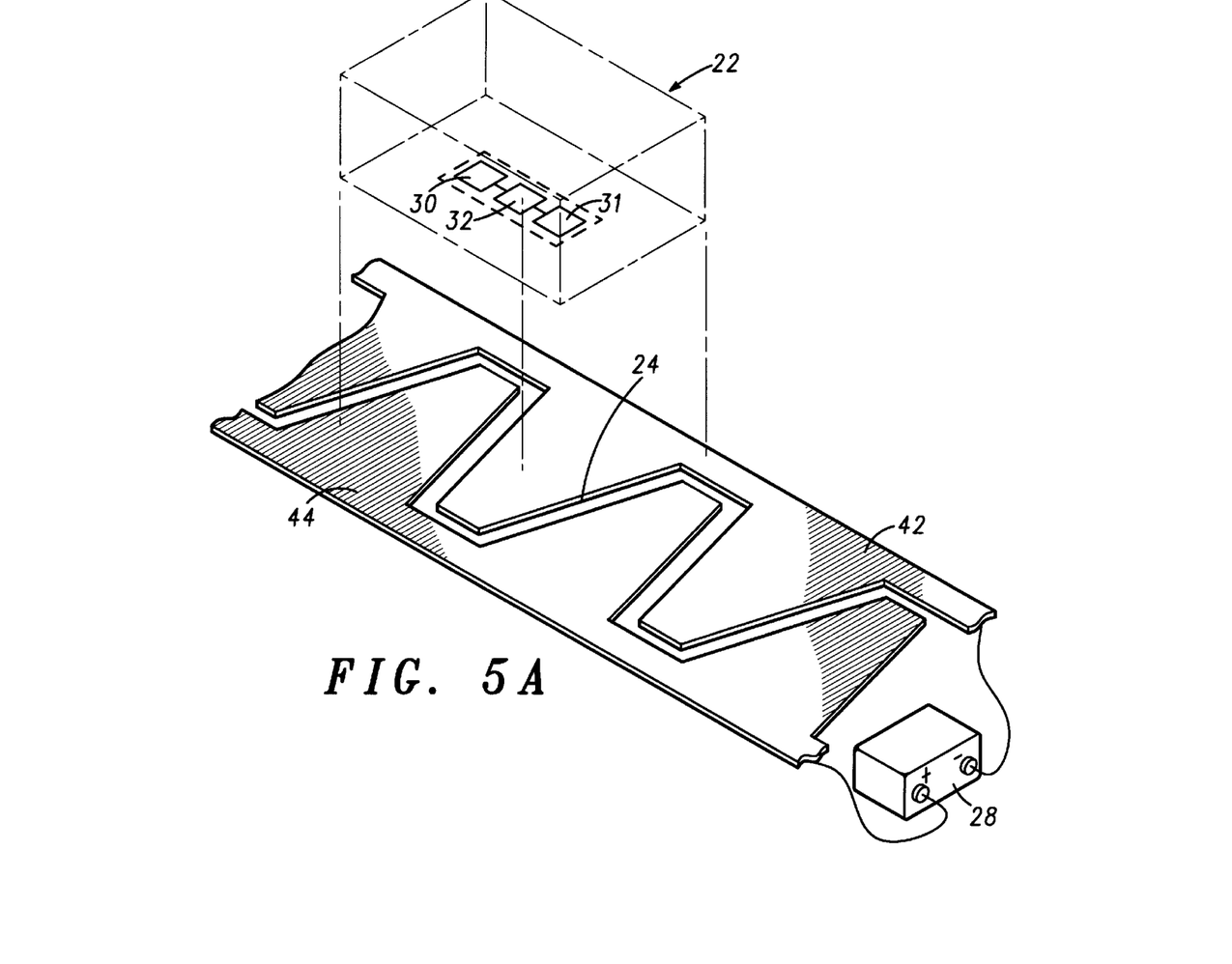
FIG. 5A is a partial top view of the conveyor support plate having a zig zag aperture positioned to isolate first and second conveyor sections, with a parcel positioned above the conveyor support plate.
Figure 5B:
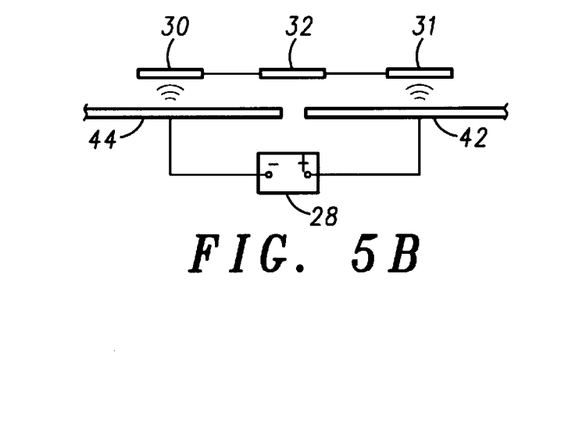
FIG. 5B is a schematic view of the reader circuit shown in relation to the transponder circuit.

As shown in FIG. 5A and 5B, the conductive conveyor support plate 12 is made of a first support plate side 42 and a second support plate side 44. The first support plate side 42 is positioned in spaced relation to the second support plate side 44, and a support plate aperture 24 extends in a continuous path between first and second support plate sides 42 and 44, electrically isolating first support plate side 42 from second support plate side 44.

Preferably, support plate aperture 24 extends in a zig zag path substantially across the width of the conveyor support plate 12, isolating first support plate side 42 from second support plate side 44. Thus, first and second support plate sides 42, 44 are of opposing polarity, as shown in FIG. 5B.

The signal from the transponder antenna 31 located in identification tag 22 is read by the reader antenna 27 as the parcel 20 traverses across the support plate aperture 24 located between the first support plate side 42 and the second support plate side 44. Coupling between reader antenna 30 and second support plate side 44, and reader antenna 31 and first support plate side 42 occur simultaneously. As previously noted, the first and second support plate sides 42 and 44 are electrically isolated from each other by support plate aperture 24.

First and Second support plate sides 42, 44 may each be made of a conductive material, such as steel. Preferably, a pattern of conductive material 46 is secured to a non-conductive support plate 42 and 44, and the pattern of conductive material 46 is connected to respective polarity generated by the reader circuit 28.

The endless conveyor belt 16 is made of a non-conductive material, such as plastic, fiberglass, etc. to enable the signal of alternating polarity to pass through the endless conveyor belt 16 to the identification tag located upon the parcel.

Figure 7A:
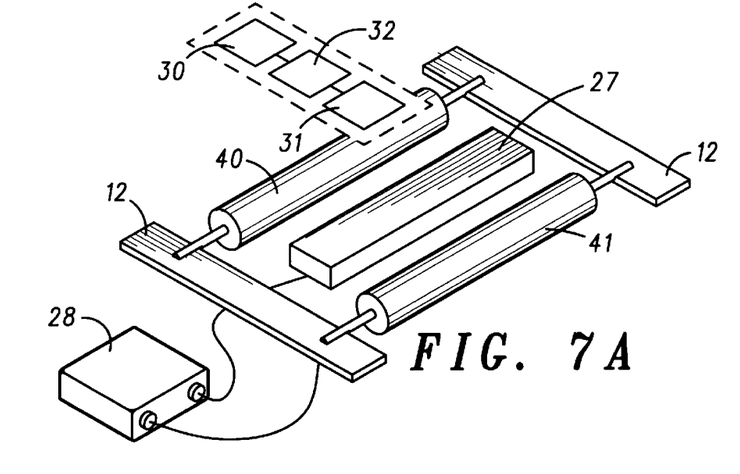
FIG. 7A is a partial view of a plurality of conductive rollers positioned in spaced relation between opposing sides of the conveyor frame, and wherein reader antenna are positioned in the space provided between adjacent rollers.

Alternately, as shown in FIG. 7A and FIG. 7B, a plurality of conductive rollers 40, 41 may extend in spaced relation between opposing sides of the conveyor frame 12. Reader antenna 27 are positioned in the space between the rollers 40, 41. The reader circuit provides one polarity to the conductive rollers 40, 41 and an opposite polarity to the reader antenna 27. The rollers 40, 41 may be driven by a chain, belt, motor or other drive means 18 to move the parcels 20 along the conveyor belt 16, in a manner well known in the art. One or more rollers 40, 41 may also be free to rotate as the parcel 20 moves along the conveyor belt 16.

The conveyor rollers 40, 41 may be inclined, to rotate in the presence of a parcel 24 by the force of gravity in a manner well known in the art.

Figure 8A:
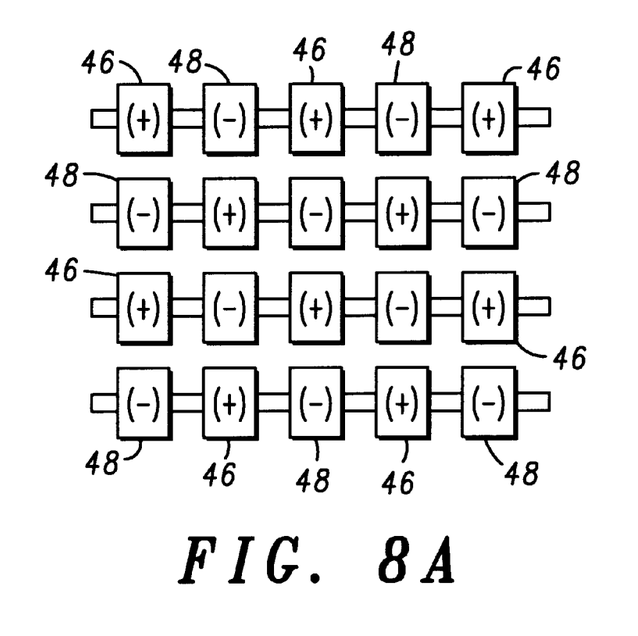
FIG. 8A is a partial view of a plurality of conductive rollers positioned in side by side relation, wherein adjacent rollers are of opposite polarity.
Figure 8B:
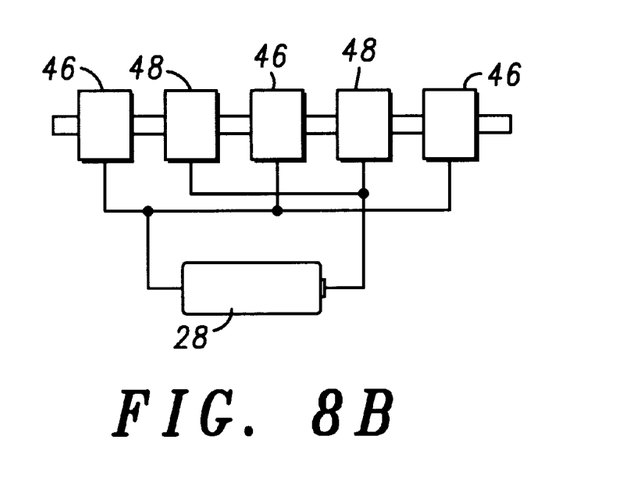
FIG. 8B is a schematic view of the conductive rollers shown in FIG. 8A.

As shown in FIG. 8A and 8B, a plurality of rollers 46, 48 may be placed in a row in side-by-side relation between opposing sides of the conveyor frame 14. The plurality of rollers 46, 48 in each row are preferably placed in alternating polarity alignment, with rollers 46 of opposite polarity to rollers 48. Adjacent rows of rollers 46, 48 are positioned in staggered alignment, so that rollers 46 of a given polarity in one row are aligned with rollers 48 of an opposite polarity in an adjacent row. Transponder antenna 30, 31 located in identification tag 22 on parcel 20 will cross over rollers 46, 48 of opposing polarity, regardless of the orientation of the parcel 20 on the endless conveyor belt 16.

While preferred embodiments of this invention have been disclosed herein, it will be understood that one of average skill in this art may make numerous modifications and adaptations of this invention, and such modifications and adaptations are intended to fall within the scope of this invention and the following claims.

We claim:

1. A conveyor apparatus for identifying a parcel having an identification tag positioned beneath said parcel, comprising:
   a) a conveyor frame for supporting a conveyor support plate thereon, the conveyor support plate having at least one aperture there-through, a non-conductive endless conveyor belt supported upon said conveyor support plate, said conveyor belt positioned for moving a plurality of parcels thereon;
   b) a first reader antenna and a second reader antenna, each of said first and second reader antennas in electrical communication with a reader circuit sending an opposing, alternating polarity signal to said first and second reader antennas, said first and second reader antennas positioned beneath said conveyor belt in proximity to said aperture provided in said conveyor support plate;
   c) each said identification tag having a first transponder antenna and a second transponder antenna in electrical communication with a transponder circuit, said first and second reader antennas in signal communication with said first and second transponder antennas located in said identification tag, said reader circuit and said transponder circuit to provide identification of said parcel as it passes along said conveyor.

2. The conveyor apparatus of claim 1, wherein the conveyor support plate is conductive.

3. The conveyor apparatus of claim 1, wherein the conveyor support plate is non-conductive, and a conductive pattern is secured upon said conveyor support plate.

4. The conveyor apparatus of claim 1, wherein a plurality of side-by-side apertures are provided in spaced relation upon said conveyor support plate, said side-by-side apertures extending in substantially offset alignment across the width of said conveyor belt, and said first and second reader antenna are disposed in opposed polarity relation with at least one reader antenna polarity located in at least one adjacent side-by-side aperture located in said conveyor support plate.

5. The conveyor apparatus of claim 1, wherein a plurality of transverse apertures extend in spaced parallel relation substantially across the width of said conveyor support plate.

6. The conveyor apparatus of claim 5, wherein at least one reader antenna is positioned within at least one of said transverse apertures in said conveyor support plate to provide signal communication between said reader antenna and said transponder antenna located on said identification tag positioned beneath said parcel.

7. The conveyor apparatus of claim 1, wherein at least one continuous aperture is positioned in an inclined zig-zag pattern extending substantially back and forth across the width of the conveyor support plate, isolating a first support plate side from a second support plate side.

8. The conveyor apparatus of claim 7, wherein said first support plate side is of opposite polarity to said second support plate side.

9. The conveyor apparatus of claim 1, wherein said conveyor support plate comprises a plurality of transverse rollers, and at least one reader antenna is positioned in a space provided between adjacent transverse rollers to provide signal communication between said reader antenna and said transponder antenna as said parcel passes along the transverse rollers on the conveyor apparatus.

10. The conveyor apparatus of claim 9, wherein said plurality of transverse rollers each comprises a plurality of side-by-side rollers to form a row of electrically isolated side-by-side rollers, with each of said side-by-side rollers of opposing polarity, and adjacent rows of side-by-side rollers are aligned in staggered relation to the polarity of side-by-side rollers on adjacent rows, and wherein the reader circuit is in electrical communication with said side-by-side rollers.

11. The conveyor apparatus of claim 1, wherein a first reader antenna is connected to a negative polarity, and a first transponder antenna is connected to a negative polarity.

12. A conveyor apparatus for identifying a parcel having an identification tag positioned beneath said parcel, comprising:
   a) a conveyor frame for supporting a conductive conveyor support plate, a plurality of transverse apertures extending through the conveyor support plate, said conveyor support plate connected to ground, with an endless, non-conductive conveyor belt positioned upon said conveyor support plate, said conveyor belt for moving said parcel thereon;
   b) a plurality of reader circuits, each said reader circuit in electrical communication with ground and at least one reader antenna, each of said reader antennas positioned beneath said conveyor belt in proximity to a selected one of said plurality of transverse apertures provided in said conveyor support plate;
   c) each said identification tag having a first transponder antenna and a second transponder antenna, with a transponder circuit in electrical communication with said first and second transponder antennas, said first transponder antenna connected to ground, and said second transponder antenna in signal communication with one of said reader antenna, to transmit data identifying said parcel, as said second transponder antenna passes along said conveyor belt in proximity to said at least one reader antenna.

13. The conveyor apparatus of claim 12, wherein said plurality of transverse apertures are aligned substantially across the width of said conveyor support plate, and at least one reader antenna is positioned within a selected one of said transverse apertures.

14. The conveyor apparatus of claim 12, wherein said plurality of transverse apertures each comprise a plurality of side-by-side apertures which are positioned in spaced, substantially offset alignment across the width of said conveyor support plate, and said reader antenna are positioned in adjacent side-by-side apertures in said conveyor support plate.

15. The conveyor apparatus of claim 12, wherein said ground connection to said reader circuit is connected to said conveyor support plate.

16. The conveyor apparatus of claim 12, wherein the conveyor support plate is made of non-conductive material, and a conductive pattern is secured upon the non-conductive conveyor support plate, and wherein said conductive pattern is connected to ground.

17. The conveyor apparatus of claim 12, wherein said plurality of transverse apertures in said conveyor support plate comprises a continuous, inclined zig-zag aperture extending substantially back and forth across the width of the conveyor support plate to form a first conveyor support plate side and a second conveyor support plate side, and said continuous, inclined zig-zag aperture electrically isolates said first conveyor support plate side from said second conveyor support plate side, and one of said first conveyor support plate side and said second conveyor support plate side are connected to ground.

18. The conveyor apparatus of claim 17, wherein said reader circuit is connected between said first conveyor support plate side and said second conveyor support plate side.

19. The conveyor apparatus of claim 12, wherein said conveyor support plate includes a plurality of transverse rollers, and said reader antenna are positioned between each of said plurality of transverse rollers in spaced relation to provide signal communication between said reader antenna and said transponder antenna, as the parcel passes in proximity to the reader antenna.

20. The conveyor apparatus of claim 19, wherein said plurality of transverse rollers each comprise a plurality of side-by-side rollers of a conductive material supported upon a roller shaft, and adjacent side-by-side rollers are electrically isolated and of alternating positive opposing polarity.

21. The conveyor apparatus of claim 20, wherein the side-by-side rollers are each of a negative polarity.

22. The conveyor apparatus of claim 20, wherein the side-by-side rollers are each of a positive polarity.

23. The conveyor apparatus of claim 20, wherein the side-by-side rollers are of an alternating positive polarity and negative polarity.

24. A conveyor apparatus for identifying a parcel having an identification tag, comprising:
   a) a conveyor frame for supporting a non-conductive conveyor support plate thereon, said non-conductive conveyor support plate having a conductive pattern secured thereon, said conveyor support plate further having a plurality of transverse apertures extending in spaced relation substantially across the width of said the conveyor support plate for supporting a non-conductive endless conveyor belt thereon, said conveyor belt positioned for moving said parcel thereon, said parcel having an identification tag positioned beneath said parcel;
   b) a plurality of reader circuits, each reader circuit in electrical communication with a first reader antenna connected to ground, and a second reader antenna positioned in a selected transverse aperture in said conveyor support plate,
   c) each identification tag on said parcel having a transponder circuit in electrical communication with a first transponder antenna and a second transponder antenna, said first transponder antenna in signal communication with said first reader antenna, and said second transponder antenna in signal communication with said second reader antenna, to transmit data between said reader circuit and said transponder circuit to identify said parcel located on said conveyor belt.

25. The conveyor apparatus of claim 24, wherein said transverse apertures each extend substantially across the width of said conveyor support plate.

26. The conveyor apparatus of claim 24, wherein said plurality of apertures extend substantially across the width of said conveyor support plate, and wherein adjacent rows of apertures are aligned in staggered relation thereto.

27. The conveyor apparatus of claim 24, wherein one said aperture is positioned in an inclined zig-zag pattern extending substantially back and forth across the width of the conveyor support plate, electrically isolating said conveyor support plate into a first conveyor support plate side and a second conveyor support plate side, and wherein said reader circuit is connected in opposite polarity between said first conveyor support plate side and said second conveyor support plate side.

28. The conveyor apparatus of claim 24, wherein said conveyor includes a plurality of rollers forming said conveyor support plate, and said plurality of reader antenna are positioned for alignment between said rollers to provide signal communication between said reader antenna and said transponder antenna.

29. The conveyor apparatus of claim 24, wherein a plurality of side-by-side rollers are aligned in a row extending between opposing sides of said conveyor, and said side-by-side rollers are electrically isolated from adjacent rollers and electrically connected to said reader circuit in alternating opposing positive polarity and negative polarity.

30. The conveyor apparatus of claim 24, wherein said side-by-side rollers are each of a negative polarity.

31. The conveyor apparatus of claim 24, wherein said side-by-side rollers are each of a positive polarity.

* * * * *